United States Patent [19]

Cutler

[11] Patent Number: 5,460,039

[45] Date of Patent: * Oct. 24, 1995

[54] FLOW SENSOR SYSTEM

[75] Inventor: Charles W. Cutler, San Bernardino, Calif.

[73] Assignee: Bear Medical Systems, Inc., Riverside, Calif.

[*] Notice: The portion of the term of this patent subsequent to Nov. 23, 2010 has been disclaimed.

[21] Appl. No.: 273,888

[22] Filed: Jul. 12, 1994

[51] Int. Cl.[6] .................................................. G01F 1/68
[52] U.S. Cl. ............................. 73/204.15; 73/204.16; 73/204.19; 73/204.18; 73/202; 73/195
[58] Field of Search ...................... 73/204.15, 204.16, 73/204.19, 204.18, 195, 202

[56] References Cited

U.S. PATENT DOCUMENTS

| | | | |
|---|---|---|---|
| Re. 33,076 | 10/1989 | Sugiura | 73/204.15 |
| 2,726,546 | 12/1955 | King, Jr. | 73/204 |
| 3,085,431 | 4/1963 | Yerman et al. | 73/204 |
| 3,363,462 | 1/1968 | Sabin | 73/204 |
| 3,603,147 | 9/1971 | Dorman | 73/204 |
| 3,645,133 | 2/1972 | Simeth et al. | 73/204 |
| 3,648,518 | 3/1972 | Hans et al. | 73/204 |
| 3,747,577 | 7/1973 | Mauch et al. | 123/32 |
| 4,008,610 | 2/1977 | Larsen et al. | 73/204 |
| 4,024,761 | 5/1977 | Djorup | 73/204 |
| 4,043,196 | 8/1977 | Trageser | 73/204 |
| 4,080,821 | 3/1978 | Johnston | 73/27 |
| 4,244,217 | 1/1981 | Ledbetter | 73/204 |
| 4,297,881 | 11/1981 | Sasayama et al. | 73/204 |
| 4,343,183 | 8/1982 | Plapp | 73/204 |
| 4,344,322 | 8/1982 | Plapp | 73/118 |
| 4,363,238 | 12/1982 | William | 73/204 |
| 4,373,387 | 2/1983 | Nishimura et al. | 73/204 |
| 4,464,932 | 8/1984 | Ewing et al. | 73/204 |
| 4,497,203 | 2/1985 | Wada | 73/204 |
| 4,527,427 | 7/1985 | Grunwald | 73/204 |
| 4,537,068 | 8/1985 | Wrobel et al. | 73/202 |
| 4,562,731 | 1/1986 | Nishimura et al. | 73/202 |
| 4,596,140 | 6/1986 | Dorman et al. | 73/204 |
| 4,599,895 | 7/1986 | Wiseman | 74/204 |
| 4,627,279 | 12/1986 | Ohta et al. | 73/195 |
| 4,686,856 | 8/1987 | Vavra et al. | 73/204 |
| 4,807,151 | 2/1989 | Citron | 364/510 |
| 4,845,984 | 7/1989 | Hohenstatt | 73/204.15 |
| 4,854,167 | 8/1989 | Czarnocki et al. | 73/204.19 |
| 4,905,514 | 3/1990 | Wiseman | 73/204.18 |
| 4,938,061 | 7/1990 | Carp | 73/204.19 |
| 4,982,605 | 1/1991 | Oram et al. | 73/204.19 |
| 5,072,614 | 12/1991 | Hisanaga | 73/204.19 |
| 5,181,420 | 1/1993 | Sugiura | 73/204.15 |
| 5,263,369 | 11/1993 | Cutler | 73/204.15 |

FOREIGN PATENT DOCUMENTS 99273  4/1991  Japan ................................. G01P 5/12

Primary Examiner—Richard Chilcot
Assistant Examiner—Jewel V. Artis
Attorney, Agent, or Firm—Klein & Szekeres

[57] ABSTRACT

A system for measuring the flow rate of gas includes a flow head having a sensor thermoresistor mounted transversely to the flow of gas, and a reference thermoresistor mounted parallel to the flow of gas, both thermoresistors having equal resistance versus temperature functions. Each thermoresistor is connected in a feedback control circuit, in which each thermoresistor is separately supplied with current to heat it, the current first passing through a fixed resistance in series with each of the thermoresistors. The current supplies are servo controlled to equalize the resistance of each thermoresistor with that of its associated fixed resistance. The power consumed by each thermoresistor at its equilibrium resistance is measured to provide a power indicative signal associated with each thermoresistor. The two power indicative signals are compared to generate a delta power signal. An empirically-derived flow rate-versus-delta power curve is stored as a look-up table in a computer memory. The value of the delta power signal is applied to address the look-up table to acquire the corresponding flow rate value.

17 Claims, 1 Drawing Sheet

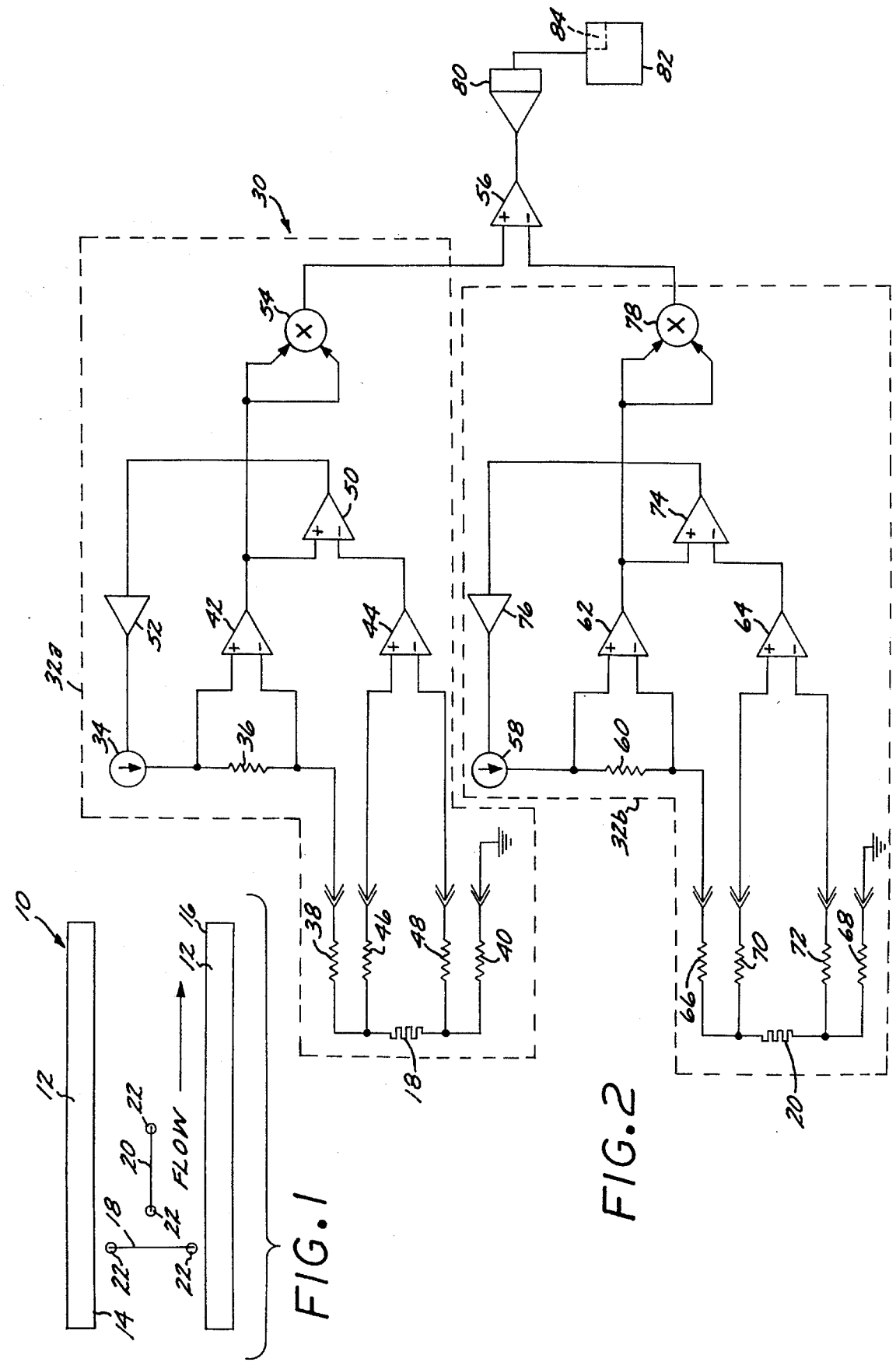

FLOW SENSOR SYSTEM

BACKGROUND OF THE INVENTION

This invention relates generally to the field of gas flow measurement. More particularly, it relates to a flow sensing system that displays high accuracy and stability, regardless of variations in gas composition and temperature.

Many types of gas flow sensor devices and systems have been used to measure the gas flow rate in pressurized gas systems, such as those used in life support pulmonary ventilators. One commonly used flow sensing system, known as a hot wire anemometer, employs a temperature-responsive, resistive sensor element (e.g., a heated wire or a thermistor) in the gas flow path, wherein the sensor element is electrically connected to a bridge circuit, so that a change in the gas flow rate produces a corresponding change in the temperature, and thus the resistance, of the sensor element. The resistance change, in turn, produces a corresponding change in the current flow through the sensor element that can be detected in the output signal of the bridge circuit. This output signal is then calibrated to correspond to a measure of the flow rate of the gas. See, for example, U.S. Pat. No. 2,726,546—King, Jr.

In flow sensors of the hot wire type, the current flow through the sensor element is a function not only of the gas flow rate, but also of such factors as the ambient temperature of the gas and the transport properties of the gas (e.g., thermal conductivity, density, and viscosity). Thus, changes in the ambient temperature of the gas, and in the composition of the gas (if it is a mixture of different constituent gases), can introduce errors in the flow rate measurement. Consequently, the prior art has sought to provide compensation for some or all of these error-inducing factors.

For example, one method that has been employed to minimize errors due to changes in ambient gas temperature has been to provide a constant temperature differential between a sensor element that is exposed to the flow of gas, and a similar sensor element that is disposed so as to be unaffected by flow rate changes, but which can sense the temperature of the gas. A similar method uses a first, heated sensing element and a second, unheated sensing element, both exposed to the flow stream. The changes in current needed to maintain the first sensing element at a constant temperature in response to the cooling effects of gas flow are read as a measure of the flow rate, while the changes in current through the second sensing element are read as a measure of ambient temperature, and are used to generate a compensation signal in the control circuitry. Examples of these approaches to temperature compensation, in the context of a bridge circuit arrangement, are found in the following U.S. Pat. Nos.: 3,085,431—Yerman et al.; 3,363,462 Sabin; 3,645,133—Simeth et al.; 3,648,518—Hans et al.; 3,747,577—Mauch et al.; 4,043,196—Trageser; 4,080,821—Johnston; 4,343,183—Plapp; 4,344,322—Plapp; 4,373,387—Nishimura et al.; 4,527,427—Grünwald; 4,537,068—Wrobel et al.; 4,562,731—Nishimura et al.; 4,596,140—Dorman et al.; 4,599,895—Wiseman; 4,686,856—Vavra et al.; 4,807,151—Citron; 4,845,984—Hohenstatt; 4,854,167—Czarnocki et al.; 4,905,514—Wiseman; 4,938,061—Carp; 4,982,605—Oram et al.; and 5,181,420—Suzuki et al.

Typically, in a bridge-type circuit, the sensor element comprises one of the resistances in the bridge circuit. Thus, if the flow sensor is connected to the other components of the bridge circuit by wires and connectors, the wires and connectors themselves become part of the bridge circuit, thereby introducing a further possible source of error, since these components tend not to be consistent in their electrical characteristics from unit to unit.

Thus, temperature-compensated flow sensor systems that employ circuits other than bridge-type circuits have been developed. Examples are found in the following U.S. Pat. Nos.: 4,244,217—Ledbetter; 4,297,881—Sasayama et al.; 5,072,614—Hisanaga; and Re. 33,076—Sigiura.

While these prior art arrangements yield improved accuracy, they may still be sensitive to changes in the transport properties of the gas, and thus may not be suitable in applications in which the composition of the gas may change, or where the gas may be subject to varying water vapor content. A flow sensor system that addresses and compensates for these additional sources of error is disclosed in U.S. Pat. No. 5,263,369—Cutler, assigned to the assignee of the invention disclosed and claimed herein.

Nevertheless, there is a continuing need, especially in medical ventilator systems, for improved accuracy and stability in gas flow measurements, whereby measurement errors due to variations in ambient gas temperature, gas transport properties, and gas mixture composition are further minimized as compared with the prior art. There is also a need to provide such improved accuracy and stability without adding undue complexity, and thus keeping manufacturing costs low.

SUMMARY OF THE INVENTION

Broadly, the present invention is a flow sensor, of the hot wire anemometer type, having a heated wire sensor element and a heated wire reference element, of equal resistance, wherein the sensor element is disposed substantially transverse to the direction of gas flow, and the reference element is disposed substantially parallel to the direction of gas flow. Because of the difference in heat dissipation between the transverse sensor element and the parallel reference element in response to gas flow past these elements, there will be a measurable difference between the sensor element power consumption value and the reference element power consumption value needed to maintain the two elements at a predetermined equal temperature. This differential power value is related to the volumetric flow rate of gas by an empirically-determined relationship that is stored as a look-up table in a computer's Read Only Memory (ROM). Thus, by obtaining the differential power value, and then addressing the look-up table in the ROM to locate this differential power value, the corresponding flow rate value is acquired, thereby obtaining a value for the instantaneous volumetric flow rate of the gas.

Because both the sensor element and the reference element are exposed to the same gas flow, in close spatial and temporal proximity, the effects of changes in gas temperature, humidity, and composition are negligible. Thus, measurement errors due to changes in the physical characteristics of the gas, including its transport properties, are minimized.

In a preferred embodiment of the invention, the sensor element and the reference element are connected in a ratiometric comparator circuit, comprising a ratiometric control loop for each of the elements. Each control loop outputs an analog output signal having a value that represents the instantaneous power consumed by the respective element in the loop, the output signal value being independent of cable and connection resistances. The two power values are then compared to obtain the differential power value, which is then inputted (after being digitized) to a microcomputer for application of the stored algorithm to obtain the volumetric flow rate.

More specifically, in each ratiometric control loop, a current generator supplies current to heat the heated wire element in that loop, the current first passing through a fixed resistor in series with the wire element. The voltage across the fixed resistor is measured, and its value is outputted as an analog output voltage signal. Likewise, the voltage across the heated wire element is measured, and this value then compared with the value of the fixed resistor voltage. The difference between these two values is used to generate an error signal that is employed in a feedback loop to vary the output of the current generator in such a way as to minimize the absolute value of the error signal. In this manner, the ratiometric loop circuit seeks and provides a current value that heats the wire element to a temperature at which its resistance is equal to the resistance of the fixed resistor. At this equilibrium resistance value, the voltage across the wire element is equal to the voltage across the fixed resistor, and this voltage is outputted as an analog output voltage signal, the value of which is squared and divided by the equilibrium resistance value to determine the power consumed by the wire element (which is equal to the power consumed by the fixed resistor).

The circuitry in each of the control loops is arranged so that the resistances presented by the various cables and connectors are isolated from, and thus have no impact on, the voltage measurements taken across the fixed resistor and the heated wire element.

The analog output signals from the two control loops, representing the values for the instantaneous power consumed by the sensor element and by the reference element, respectively, are then compared to obtain a differential power signal value, which is then digitized and provided as an input signal to the microcomputer, which processes the input signal, by means of the stored algorithm, to obtain an instantaneous volumetric flow rate value.

As will be more fully appreciated from the detailed description that follows, the present invention offers a mechanism for substantially instantaneous, real-time measurement of volumetric flow rate, exhibiting a high degree of accuracy and stability, while minimizing errors induced by changes in ambient temperature, gas transport properties, and gas mixture composition.

BRIEF DESCRIPTION OF THE DRAWINGS

FIG. 1 is a diagrammatic representation of a hot wire flow head, as used in the present invention; and FIG. 2 is a schematic diagram of a preferred embodiment of the electronic circuit used in the present invention.

DETAILED DESCRIPTION OF THE INVENTION

Referring first to FIG. 1, a hot wire flow head 10, of the type employed in the present invention, is shown diagrammatically. The flow head 10 comprises a tubular housing 12 having an open inlet end 14 and an open outlet end 16. Mounted within the housing 12 is a first thermoresistive wire element 18 mounted transversely to the direction of gas flow (indicated by the arrow), and a second thermoresistive wire element 20 mounted parallel to the direction of gas flow. The first or transverse wire element 18 may also be termed the "sensor" element, while the second or parallel wire element 20 may be termed the "reference" element, as will be made clear below. The wire elements 18, 20 may be supported within the housing 12 on insulative supports 22, with leads (not shown) extending through the housing wall for connection to one of the circuits to be described below.

The wire elements 18, 20 have identical thermoresistive characteristics, in that the sensing element 18 and the reference element 20 will exhibit the same resistance at any given temperature within a given temperature range. In a zero gas flow condition, the same current flowing through the two elements will result in equal power consumption by the two elements. When gas flows through the flow head 10, however, the transverse sensor element 18 will experience a greater heat loss in response to the gas flow than will the parallel reference element 20 (as will be explained below), thereby lowering its resistance relative to the reference element. Therefore, to maintain the two wire elements at an equal temperature, the current must be increased through the sensor element 18, thereby increasing its power consumption relative to that of the reference element 20. The difference in power consumed by the sensor element and the reference element in maintaining the two elements at the same temperature is thus a function of the flow rate of the gas. Since both elements are located in close proximity to each other and are exposed to the same gaseous medium, variations in gas temperature, composition of the gas mixture, and humidity will have a negligible effect upon the resultant power differential. The function of the present invention, therefore, is to measure this power differential, and then relate it quantitatively to the flow rate of gas through the sensor head 10.

By nulling the no-flow power value $P_o$ for both wire elements 18, 20, and comparing the current in the two elements at a given, fixed temperature, the difference between the sensor element power $P_s$ and the reference element power $P_r$ needed to maintain that temperature in the two wire elements in response to gas flow can be ascertained, using the circuit described below.

FIG. 2 diagrammatically illustrates a preferred embodiment of a signal processing circuit 30 for obtaining an output signal indicative of the volumetric flow rate of gas through the flow head 10. The signal processing circuit 30 comprises a pair of ratiometric comparator circuits: a first comparator circuit 32a for the sensor element 18, and a second comparator circuit 32b for the reference element 20.

The first comparator circuit 32a includes a first current generator 34 that supplies current to the sensor element 18, thereby heating the sensor element 18. Connected in series between the first current generator 34 and the sensor element 18 is a first current sense resistor 36, which is a fixed resistance of known value. The heating current also passes through cables and connectors, schematically represented by series resistors 38 and 40. A first differential amplifier 42 is connected across the first current sense resistor 36, producing a first analog output signal having a voltage value that is related to the heating current supplied to the sensor element 18 by Ohm's Law (and by a known amplification factor). Thus, by knowing the output voltage and the amplification factor of the first amplifier 42 and the value of the first current sense resistor 36, the heating current through the first current sense resistor 36, and therefore the sensor element 18, can be measured.

Similarly, a second differential amplifier 44 is connected across the sensor element 18, and produces a second analog output signal having a value that is indicative of the voltage across the sensor element 18. Since the heating current through the sensor element 18 is known (by means of the output signal value from the first amplifier 42, as described above), the value of the output signal of the second amplifier 44 is indicative, via Ohm's Law, of the instantaneous resistance of the sensor element 18. (Additional cable and connector resistances, represented schematically by resistors 46 and 48 in the input leads of the second amplifier 44, may also be present in the circuit.)

The output signals from both the first amplifier 42 and the second amplifier 44 are fed into a third differential amplifier 50, which produces a third output signal having a voltage value that is proportional to the difference in the first and second output signal values. This third output signal, which is advantageously amplified by a fourth amplifier 52, is then fed back as an input to the first current generator 34 as a correction signal to adjust the heating current to a value which minimizes the difference between the first and second output signal values.

In other words, since the current through the first current sense resistor 36 is necessarily equal to the heating current through the sensor element 18, and since the resistance of the sensor element 18 is a known function of the heating current through it, the first comparator circuit 32a will be in balance when the value of the heating current is such as to make the resistance of the sensor element 18 equal to the fixed resistance of the first current sense resistor 36, thereby equalizing the voltage drops across the sensor element 18 and the first current sense resistor 36.

With the respective resistances of the first current sense resistor 36 and the sensor element 18 thus equalized to an equilibrium value which equals the known, fixed value of the first current sense resistor 36, and with the value of the heating current which produces this equilibrium state known (by the application of Ohm's Law to the voltage value of either the first or second output signals), the power $P_s$ delivered to the sensor element 18 is also known, by the formula:

$$P_s = I_s^2 R_1 \quad (1)$$

where $I_s$ is the heating current through the sensor element 18, and where $R_1$ is the resistance of the first current sense resistor 36.

Equivalently, sensor element power may be expressed as:

$$P_s = V_1^2/R_1 \quad (2);$$

where $V_1$ is the voltage value of the first output signal.

Thus, the voltage value of the first output signal, when squared and divided by the resistance of the first sense resistor 36, provides an accurate measurement of the power delivered to the sensor element 18. Therefore, to obtain the squared value of the first output signal voltage, the first output signal is fed into a first squaring circuit 54, and this squared first output signal value is then inputted to a final differential amplifier 56 for final processing, as described below.

The cable and connector resistances (represented by the resistors 38, 40, 46, and 48) are not involved in the calculation of sensor element power Ps, and thus do not affect the measurement of this parameter.

It should be noted that it is not necessary for the operation of the circuit to require, for balancing the circuit, that the resistance of the sensor element 18 equal that of the first current sense resistor 36. This condition of resistance equality will result when the respective gains of the first amplifier 42 and the second amplifier 44 are equal. If the respective gains of the two amplifiers are not equal, but instead are related by a gain ratio, then the circuit is balanced when the ratio of the two resistances is the reciprocal of the gain ratio.

The second comparator circuit 32b for the reference element 20 is essentially identical to the first comparator circuit 32a described above. Thus, the second comparator circuit 32b comprises a second current generator 58 that supplies heating current to the reference element 20 through a second current sense resistor 60, of known, fixed value, equal to the value of the first current sense resistor. A fifth amplifier (differential amplifier) 62 is connected across the second current sense resistor 60, producing a third analog output signal having a voltage value that is related to the heating current value by Ohm's Law and the amplifier's gain. A sixth amplifier (differential amplifier) 64 is connected across the reference element 20, and produces a fourth analog output signal having a value that is indicative of the voltage across the reference element 20, and therefore, as explained above in connection with the second amplifier 44 and the sensor element 18, of the instantaneous resistance of the reference element 20. As described above for the first comparator circuit 32a, cable and connector resistances are shown schematically by fixed resistors 66, 68, 70, and 72.

The third and fourth output signals from the fifth amplifier 62 and the sixth amplifier, respectively, are fed into a seventh amplifier (differential amplifier) 74, which performs a function analagous to that of the third amplifier 50 of the first comparator circuit 32a: It produces a fifth output signal having a voltage value that is proportional to the difference in the third and fourth output signal values. This fifth output signal, which is advantageously amplified by an eighth amplifier 76, is then fed back as an input to the second current generator 58 as a correction signal to adjust the heating current through the reference element 20 to a value that minimizes the difference between the third and fourth output signal values.

The second comparator circuit 32b functions in a manner that is essentially identical to the operation of the first comparator circuit 32a. Thus, if the gains of the fifth amplifier 62 and the sixth amplifier 64 are equal, the circuit 32b is in balance when the value of the heating current through the reference element 20 is such as to make the resistance of the reference element 20 equal to an equilibrium value which equals the fixed resistance of the second current sense resistor 60, thereby equalizing the voltage drops across the reference element 20 and the second current sense resistor 60. Therefore, the power $P_r$ delivered to the reference element 20 can be expressed as:

$$P_r = I_r^2 R_2 \quad (3),$$

where $I_r$ is the heating current through the reference element 20, and where $R_2$ is the resistance of the second current sense resistor 60.

Equivalently, $P_r$ can be expressed as:

$$P_r = V_3^2/R_2 \quad (4)$$

where $V_3$ is the voltage value of the third output signal.

Thus, the voltage value of the third output signal, when squared and divided by the resistance of the second sense resistor 60, provides an accurate measurement of the power delivered to the reference element 20. Therefore, to obtain the squared value of the third output signal voltage, the third output signal is fed into a second squaring circuit 78, and this squared third output signal value is then inputted to the final differential amplifier 56 for final processing.

The final differential amplifier 56 receives, as inputs, the squared first output signal and the squared third output signal, as described above, and compares these squared values to yield a final analog output signal that indicates the difference between the two squared values. This difference, which may be termed ΔP, represents the difference in the power respectively delivered to the sensor element 18 and the reference element 20 at any given flow rate of gas through the flow head 10. Mathematically, the value of the final analog output signal may be expressed as:

$$\Delta P = V_s^2/R_1 - V_r^2/R_2; \text{ or} \tag{5}$$

since $R_1 = R_2 = R$:

$$\Delta P = (V_s^2 - V_r^2)/R \tag{6}$$

The final analog output signal is fed into an analog-to-digital converter (A/D converter) 80, thereby digitizing the signal for input into a microcomputer 82. The microcomputer includes a Read Only Memory (ROM) 84, that has stored within it, in the form of a look-up table, the values corresponding to an empirically-derived flow rate-versus-delta power curve. Thus, the digitized ΔP value is used to address the look-up table, thereby acquiring the corresponding flow rate value, which is then outputted to an appropriate display device, such as a CRT (not shown), usually after conversion into an analog signal by conventional means (not shown).

The flow rate-versus-delta power curve that is stored in the ROM can be empirically-derived for each individual flow head 10 during the manufacturing process by constructing the flow head 10 and the circuit 30, and then causing known flow rates of gas (controlled, for example, by a precision flow control system, of any suitable type known in the art) to flow through the flow head 10. The values of ΔP corresponding to each desired flow rate value in the selected range are then measured (by conventional means) to derive the flow rate-versus-delta power curve. The values from this curve are then stored in the ROM. In this manner, each flow sensor system according to the present invention is individually pre-calibrated by the manufacturer prior to clinical usage, thereby eliminating the need for further calibration by the clinician, while also providing precise compensation for variations between individual flow sensing systems, due to, for example, the tolerances in the physical and electrical characteristics of the constituent components.

An example of a look-up table with values from an empirically-derived flow rate-versus-delta power curve is reproduced below, with $R_1 = R_2 = 5$ ohms.

| ΔPower(mw) | Flow rate (Liter/min) |
|---|---|
| 2.1 | 0.0 |
| 26.5 | 0.1 |
| 31.0 | 0.2 |
| 35.3 | 0.3 |
| 38.5 | 0.4 |
| 45.1 | 0.6 |
| 51.4 | 0.8 |
| 61.0 | 1.2 |
| 69.6 | 1.6 |
| 82.4 | 2.4 |
| 94.2 | 3.2 |
| 113.5 | 4.8 |
| 129.5 | 6.4 |
| 154.9 | 9.6 |
| 173.4 | 12.8 |
| 205.0 | 19.2 |
| 229.9 | 25.6 |
| 269.3 | 38.4 |
| 273.0 | 40.0 |

The above table could easily be normalized or scaled so that a nulled delta power corresponds to zero flow rate.

The system described above is capable of achieving very high degrees of accuracy in flow rate measurement, even at low flow rates. For example, flow rate measurements with an accuracy of 1 per cent can be achieved, even at flow rates as low as 50 ml/min. Such high accuracy at low flow rates makes the present invention particularly well-suited for use in mechanical pulmonary ventilation systems, especially those used for neonates.

A number of modifications and variations of the circuitry described above will suggest themselves to those skilled in the pertinent arts. For example, the functions of the squaring circuits 54, 78 and of the final differential amplifier 56 may be combined in a single circuit. Also, the squaring circuits can be eliminated if it is desired to have a look-up table of flow rate-versus-delta current or flow rate-versus delta voltage. While the elimination of the squaring circuits provides a simpler, more economical device, there would be a loss of discrimination at higher flow rates, thereby limiting the useful range of the device.

What is claimed is:

1. A system for measuring the flow rate of gas, comprising:

a flow head, having an inlet and an outlet, for directing a flow of gas from the inlet to the outlet;

a first thermoresistive element mounted in the flow head so as to be substantially transverse to the direction of gas flow;

a second thermoresistive element mounted in the flow head so as to be substantially parallel to the direction of gas flow, the first and second thermoresistive elements having substantially equal resistances at any given temperature within a selected temperature range;

first and second current generators for supplying electrical currents respectively to the first and second thermoresistive elements to heat the first and second thermoresistive elements to a predetermined temperature within the selected temperature range;

first signal generating means for generating a first power-indicative signal, indicating the power consumed by the first thermoresistive element in being maintained at the predetermined temperature in response to the flow of gas;

second signal generating means for generating a second power-indicative signal, indicating the power consumed by the second thermoresistive element in being maintained at the predetermined temperature in response to the flow of gas;

comparator means, responsive to the first and second power-indicative signals, for generating a delta power signal having a value representing the amplitude difference between the first and second power-indicative signals;

memory means for electronically storing a look-up table comprising a set of values from an empirically-derived flow rate-versus-delta power curve; and computer means, responsive to the delta power signal, for addressing the look-up table to acquire a flow rate value corresponding to the value of the delta power signal.

2. The system of claim 1, wherein the delta power signal is an analog signal, and wherein the system further comprises:

an analog-to-digital converter for digitizing the delta power signal prior to inputting the delta power signal to the computer means.

3. The system of claim 1, wherein the comparator means comprises a differential amplifier.

4. The system of claim 1, wherein the first signal generating means comprises:

a first fixed resistance in series between the first current generator and the first thermoresistive element;

first voltage measuring means for generating a first voltage signal indicative of the voltage across the first fixed resistance;

second voltage measuring means for generating second voltage signal indicative of the voltage across the first thermoresistive element;

first feedback means, responsive to the first and second voltage signals, for (a) generating a first feedback signal having a value that is indicative of the amplitude difference between the first and second voltage signals, and (b) applying the first feedback signal to the first current generator to control the current applied to the first fixed resistance and the first thermoresistive element so as to minimize the value of the first feedback signal, thereby providing a current that heats the first thermoresistive element to a temperature at which the resistance of the first thermoresistive element is substantially equal to the first fixed resistance; and a first squaring circuit for squaring the value of the first voltage signal to provide the first power-indicative signal.

5. The system of claim 4, wherein the second signal generating means comprises:

a second fixed resistance in series between the second current generator and the second thermoresistive element;

third voltage measuring means for generating a third voltage signal indicative of the voltage across the second fixed resistance;

fourth voltage measuring means for generating fourth voltage signal indicative of the voltage across the second thermoresistive element;

second feedback means, responsive to the third and fourth voltage signals, for (a) generating a second feedback signal having a value that is indicative of the amplitude difference between the third and fourth voltage signals, and (b) applying the second feedback signal to the second current generator to control the current applied to the second fixed resistance and the second thermoresistive element so as to minimize the value of the second feedback signal, thereby providing a current that heats the second thermoresistive element to a temperature at which the resistance of the second thermoresistive element is substantially equal to the second fixed resistance; and a second squaring circuit for squaring the value of the third voltage signal to provide the second power-indicative signal.

6. The system of claim 5, wherein the first fixed resistance is substantially equal to the second fixed resistance.

7. The system of claim 5, wherein the first feedback means comprises a first differential amplifier that generates the first feedback signal in response to the first and second voltage signals.

8. The system of claim 7, wherein the second feedback means comprises a second differential amplifier that generates the second feedback signal in response to the third and fourth voltage signals.

9. The system of claim 8, wherein the comparator means comprises a third differential amplifier.

10. A method of measuring gas flow through a flow head, comprising the steps of:

(a) providing a first thermoresistive element in the flow head substantially transverse to the direction of gas flow;

(b) providing a second thermoresistive element in the flow head substantially parallel to the direction of gas flow, the first and second thermoresistive elements having substantially equal resistances at any given temperature within a selected temperature range;

(c) supplying first and second currents respectively to the first and second thermoresistive elements to heat the first and second thermoresistive elements to a predetermined temperature within the selected temperature range;

(d) generating first and second indicative signals indicating the values of an electrical parameter respectively associated with the resistances of the first and second themoresistive elements at the predetermined temperature;

(e) generating a delta signal indicative of the amplitude difference between the first and second indicative signals; and (f) comparing the value of the delta signal to a predetermined delta value in an empirically-derived flow rate-versus-delta value curve to determine the corresponding flow rate value.

11. The method of claim 10, wherein the first and second indicative signals are first and second power indicative signals, respectively indicating the power consumed by the first and second thermoresistive elements in being maintained at the predetermined temperature, wherein the delta signal is a delta power signal, and wherein the delta value is a delta power value.

12. The method of claim 10, wherein the step of generating the first and second indicative signals comprises the steps of:

(g) providing a first fixed resistance in series with the first thermoresistive element so as to be supplied with the same current;

(h) generating a first voltage signal indicative of the voltage across the first fixed resistance;

(i) generating a second voltage signal indicative of the voltage across the first thermoresistive element;

(j) generating a first feedback signal having a value that is indicative of the amplitude difference between the first and second voltage signals;

(k) applying the first feedback signal to control the current applied to the first fixed resistance and the first thermoresistive element so as to minimize the value of the first feedback signal, thereby providing a current that heats the first thermoresistive element to a temperature at which the resistances of the first thermoresistive element and the first fixed resistance are substantially equal to a first equilibrium resistance value;

(l) deriving the value of the first indicative signal from an electrical parameter of the first fixed resistance associated with the first equilibrium resistance value;

(m) providing a second fixed resistance in series with the second thermoresistive element so as to be supplied with the same current;

(n) generating a third voltage signal indicative of the voltage across the second fixed resistance;

(o) generating a fourth voltage signal indicative of the voltage across the second thermoresistive element;

(p) generating a second feedback signal having a value that is indicative of the amplitude difference between the third and fourth voltage signals;

(q) applying the second feedback signal to control the current applied to the second fixed resistance and the first thermoresistive element so as to minimize the value of the second feedback signal, thereby providing a current that heats the second thermoresistive element to a temperature at which the resistances of the second thermoresistive element and the second fixed resistance are substantially equal to a second equilibrium resistance value; and (r) deriving the value of the second indicative signal from an electrical parameter of the second fixed resistance associated with the second equilibrium resistance value.

13. The method of claim 11, wherein the step of generating the first and second power indicative signals comprises the steps of:

(g) providing a first fixed resistance in series with the first thermoresistive element so as to be supplied with the same current;

(h) generating a first voltage signal indicative of the voltage across the first fixed resistance;

(i) generating a second voltage signal indicative of the voltage across the first thermoresistive element;

(j) generating a first feedback signal having a value that is indicative of the amplitude difference between the first and second voltage signals;

(k) applying the first feedback signal to control the current applied to the first fixed resistance and the first thermoresistive element so as to minimize the value of the first feedback signal, thereby providing a current that heats the first thermoresistive element to a temperature at which the resistances of the first thermoresistive element and the first fixed resistance are substantially equal;

(l) squaring the value of the first voltage signal to provide the first power indicative signal;

(m) providing a second fixed resistance in series with the second thermoresistive element so as to be supplied with the same current;

(n) generating a third voltage signal indicative of the voltage across the second fixed resistance;

(o) generating a fourth voltage signal indicative of the voltage across the second thermoresistive element;

(p) generating a second feedback signal having a value that is indicative of the amplitude difference between the third and fourth voltage signals;

(q) applying the second feedback signal to control the current applied to the second fixed resistance and the first thermoresistive element so as to minimize the value of the second feedback signal, thereby providing a current that heats the second thermoresistive element to a temperature at which the resistances of the second thermoresistive element and the second fixed resistance are substantially equal; and (r) squaring the value of the third voltage signal to provide the second power indicative signal.

14. The method of claim 12, wherein the first equilibrium resistance value is substantially equal to the first fixed resistance, and wherein the second equilibrium resistance value is substantially equal to the second fixed resistance.

15. A method for measuring the flow rate of gas through a flow head, comprising the steps of:

(a) providing a first thermoresistive element in the flow head substantially transverse to the direction of gas flow;

(b) providing a second thermoresistive element in the flow head substantially parallel to the direction of gas flow, the first and second thermoresistive elements having substantially equal resistances at any given temperature within a selected temperature range;

(c) supplying first and second currents respectively to the first and second thermoresistive elements to heat the first and second thermoresistive elements to a temperature within the selected temperature range;

(d) providing a first fixed resistance supplied with the first current and a second fixed resistance supplied with the second current;

(e) servo controlling the first and second currents respectively to equalize the resistance of the first thermoresistive element to a first equilibrium resistance substantially equal to the first fixed resistance, and the resistance of the second thermoresistive element to a second equilibrium resistance substantially equal to the second fixed resistance;

(f) comparing the power consumed by the first thermoresistive element at the first equilibrium resistance to the power consumed by the second thermoresistive element at the second equilibrium resistance to generate a delta power signal; and (g) comparing the value of the delta power signal to a predetermined delta power value in an empirically-derived flow rate-versus-delta power curve to determine the corresponding flow rate value.

16. The method of claim 15, wherein the servo controlling step comprises the steps of:

(h) generating a first voltage signal indicative of the voltage across the first fixed resistance;

(i) generating a second voltage signal indicative of the voltage across the first thermoresistive element;

(j) generating a first feedback signal having a value that is indicative of the amplitude difference between the first and second voltage signals;

(k) applying the first feedback signal to control the current applied to the first fixed resistance and the first thermoresistive element so as to minimize the value of the first feedback signal, thereby providing a current that heats the first thermoresistive element to a temperature at which the resistances of the first thermoresistive element and the first fixed resistance are substantially equal;

(l) squaring the value of the first voltage signal to provide a first power indicative signal;

(m) generating a third voltage signal indicative of the voltage across the second fixed resistance;

(n) generating a fourth voltage signal indicative of the voltage across the second thermoresistive element;

(o) generating a second feedback signal having a value that is indicative of the amplitude difference between the third and fourth voltage signals;

(p) applying the second feedback signal to control the current applied to the second fixed resistance and the first thermoresistive element so as to minimize the value of the second feedback signal, thereby providing a current that heats the second thermoresistive element to a temperature at which the resistances of the second thermoresistive element and the second fixed resistance are substantially equal; and (q) squaring the value of the third voltage signal to provide a second power indicative signal.

17. The method of claim 16, wherein the comparing step comprises the step of comparing the first and second power indicative signals.

* * * * *